UNITED STATES PATENT OFFICE 2,139,929

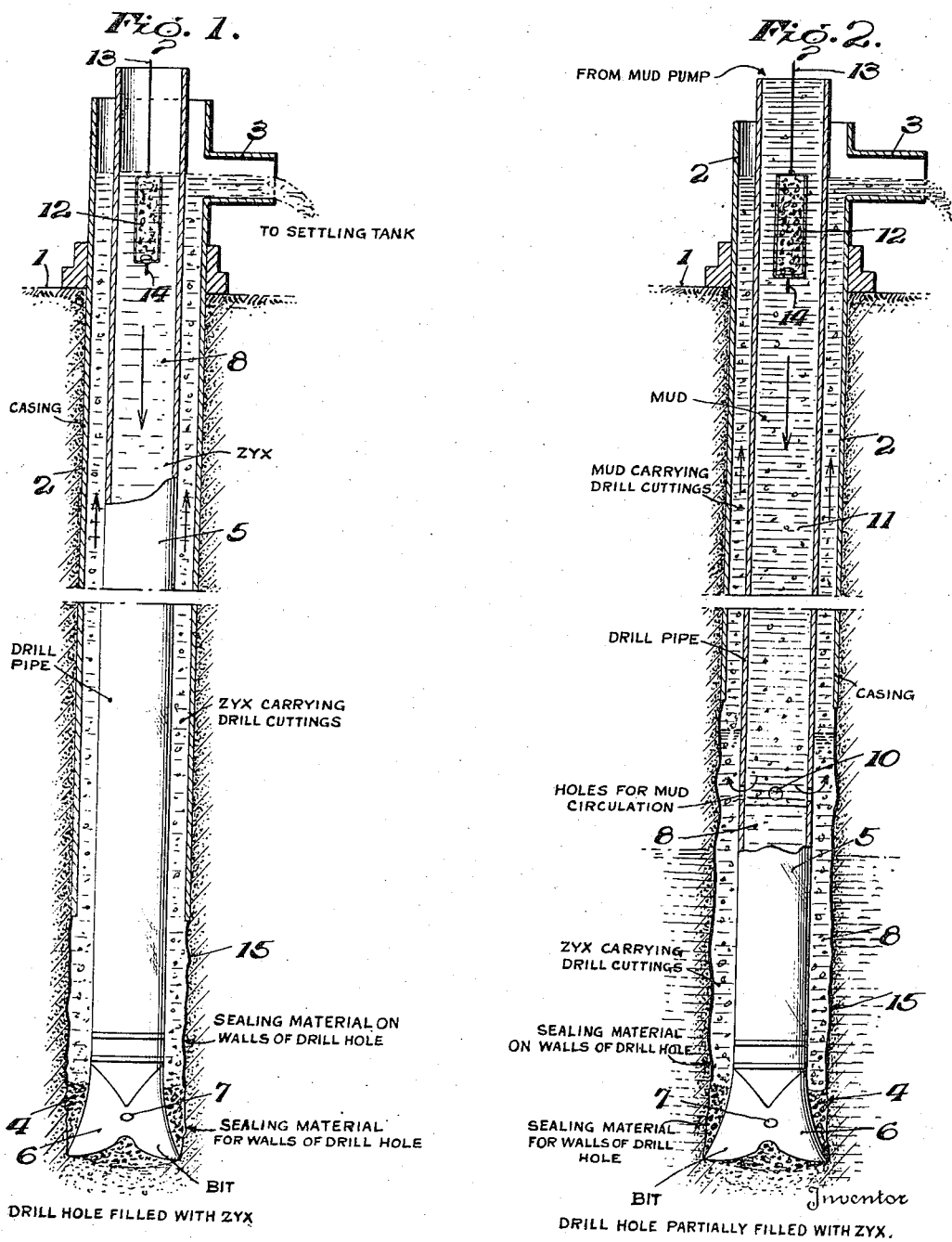

PROCESS OF SEALING THE WALLS OF WELLS WHILE DRILLING SAME

George Blow, New York, N. Y.

Application October 16, 1936, Serial No. 106,056

10 Claims. (Cl. 255—1)

This invention relates to improvements in the method of drilling wells or bore holes in rock by means of a heavy liquid as the drilling fluid, such as described in U. S. Patent No. 2,043,504.

One of the objects of this invention is to decrease the absorption of the heavy drilling liquid by rock formations as they are penetrated by the drill.

Another object of the invention is to prevent the penetration and loss of the heavy drilling liquid into porous rock formations.

Another object is to coat the walls of the drill hole with an impervious film of inert material to consolidate the walls and smooth the bore of the hole.

Still another object is to prevent the displacement of gas, oil, or water in their respective formations by a heavy liquid when such liquid is used as the drilling fluid.

The method of drilling as described in U. S. Patent No. 2,043,504 employs a heavy liquid as the drilling fluid for rotary and other drills. This liquid is heavier than the rocks through which the hole is drilled, and the drill cuttings are buoyed thereby from the bottom of the hole to the surface of the liquid. Several other advantages are also gained which are not necessary to describe here. A number of liquids are available for this service, but the most desirable are those which are immiscible with water, such as acetylene tetrabromide and methylene iodide.

Rock formations are all somewhat porous and absorbent and it is evident that the high hydrostatic pressure of the column of liquid in the hole will tend to force the heavy drilling liquid into the various formations as they are penetrated by the drill. Any such absorption or infiltration results in a loss of the drilling liquid and a consequent increase in the cost of drilling operations. Furthermore, there is a possibility that the heavy liquid might displace gas, oil or water in any strata where they should occur and likewise cause a loss of the drilling liquid. By the present invention loss of the drilling liquid is prevented by coating the walls of the drill hole with any suitable finely-divided material to seal off the well against infiltration of the drilling fluid. With this end in view, suitable inert material is ground so as to provide a variety of particle sizes from those which are plainly visible to the naked eye down to those which are colloidal in character. This material may be heavier or lighter than the drilling fluid employed. Barite and iron oxide are samples of materials, heavier than the drilling fluid and Portland cement is an example of a material lighter than the drilling fluid. This ground material is then mixed with a suitable liquid vehicle to form a thin pulp, the liquid vehicle employed being one with which the drilling liquid is immiscible and also having a different surface tension. For example, the said liquid vehicle may be water and the heavy drilling fluid may be acetylene tetrabromide or methylene iodide. Water is immiscible with either of these and the surface tension of water is 72.75 dynes per cm., while that of acetylene tetrabromide and methylene iodide is considerably lower. These two heavy drilling fluids and water as the liquid vehicle for the ground material are merely given as illustrative of the principle involved in the present invention, which principle is that the drilling fluid must be immiscible with the liquid vehicle for the sealing material and have a different surface tension.

A thin pulp being formed by mixing the ground material with water, the pulp is introduced into the bottom of the well through the drill pipe by any suitable means during the drilling operation, and as it is discharged from the drill pipe it immediately forms a film-like coating on the walls of the hole as the drilling proceeds. This results from the fact that the particles in the coating pulp are wet by the water and not by the drilling fluid; and, since the water is repellent to the drilling fluid the surface tension of the water tends to draw the particles away from the drilling fluid and into together away from the drilling fluid and into contact with the wall of the drill hole. The surface tension of the water with which the particles are wetted is a positive force holding the particles together so that they are not dispersed in the heavy drilling fluid, but are attached to the surface of the drill hole. The hydrostatic pressure then acts to drive the particles into the pores of the rock and seal the formation against entrance by the drilling fluid. It will thus be seen that advantage is taken of the unique properties of heavy drilling fluids, to wit, their immiscibility with water, the difference in the surface tension of water and the drilling fluid employed, and the high specific gravity of the drilling fluid, with the result that the sealing material is placed in position on the walls of the drill hole by the combined action of surface tension and high hydrostatic pressure.

By this method a loss of the heavy drilling liquid is prevented, not only into dry porous formations but also in the possible displacement of oil, gas, or water in formations where these might be encountered in the process of drilling.

The invention will be better understood by reference to the accompanying drawing illustrating drill holes in which the invention is carried out.

In said drawing—

Fig. 1 is a broken vertical section of a drill hole in which a rotary drill pipe and bit are employed, the hole and pipe being filled with a drilling liquid whose specific gravity is greater than that of any of the rock formations through which the drill hole passes; and Fig. 2 is a like vertical section of a drill hole also employing a rotary drill pipe and bit, with the drilling liquid, heavier than the rocks through which the drill passes, surrounding the drill pipe and bit in the lower portion of the drill hole while the upper portion thereof and the greater portion of the drill pipe are filled with the usual or any drilling mud.

In the several views of the drawing like reference numerals indicate like parts throughout the several views. Referring to Fig. 1 first, 1 indicates the earth surface, 2 the usual or any suitable casing which at its upper end projects somewhat above the surface 1 and is provided with a slush discharge pipe 3. The lower end of the casing 2, as in usual constructions, extends downward toward but not entirely to the bottom of the drill hole. The rotary pipe 5, operated in the usual or any suitable manner (mechanism not shown), has a bit 6, of any suitable or preferred construction, at the lower end thereof, and this bit has an opening or openings 7 to the end that the interior of the pipe 5 and the drill hole, exterior to said pipe, may be in open communication. The drill pipe is filled with a drilling liquid 8, heavier than the rocks through which the drill hole is to pass, which, on the drawing is indicated as Zyx. The drilling liquid passes downward through the drill pipe 5 and outward through the holes 7 in the bit 6 into and fills the drill hole, and since the liquid Zyx is heavier than the rock in which the drilling occurs, the drill cuttings will rise in the liquid Zyx exterior to the drill pipe and be floated by said liquid to the surface and discharged through the discharge pipe 3 into a suitable tank or receptacle not shown.

It will be readily appreciated that since the liquid Zyx is heavier than any of the rocks through which the drilling occurs, the walls of the hole at any depth are under a greater pressure than the superincumbent pressure of the overlying rock formations. This high hydrostatic pressure serves to confine gas, oil or water to the formations in which they occur and at the same time prevent sloughing or caving into the hole. It will also be observed that while mechanical circulation may be employed, if desired, it is not necessary, since there will be a natural circulation by reason of the fact that the column of Zyx outside of the drill pipe is of less weight per unit volume, due to the included cuttings, than the column inside of the same, and circulation in the proper direction is therefore produced.

The finely ground sealing material mixed with and thoroughly wetted by water is introduced into the bottom of the well through the drill pipe 5. If this finely ground sealing material is heavier than the drilling liquid Zyx, the said sealing material, wetted with water, may be simply delivered into the upper portion of the drill pipe 5, and will pass downward to the bit and together with the drilling liquid Zyx pass out through the holes 7 in the bit, and being heavier than the drilling liquid Zyx will accumulate for use at the bottom of the drill hole, as indicated at 4.

If, however, the sealing material is lighter than the drilling liquid Zyx, it may be delivered downward through the drill pipe by any suitable means known to the art, such for example as a container 12, composed of metal heavier than the drilling liquid Zyx, to the end that it will readily sink therein. This container 12 is suspended on a wire or cable 13 by means of which it is lowered through the drill pipe and is provided with a valve 14 which automatically opens when the container reaches the bottom of the drill pipe and comes in contact with the drill bit, with the result that the sealing material passes outward with the drilling liquid into the bottom of the drill hole.

In case the drill pipe has the heavier drilling liquid only in the bottom portion thereof, as shown in Fig. 2, and as described in the aforesaid U. S. Patent No. 2,043,504, and with the upper portion of the drill pipe filled with drill mud 11 (Fig. 2), practically the same method of introducing the sealing material into the drill hole through the drill pipe is employed as that described in connection with Fig. 1. If the drilling material is such that it will readily pass down with the mud, it may be directly introduced into the drill pipe, together with the mud, and will pass downward through the drill pipe to the drill bit and pass outward through the holes 7, as in Fig. 1. If, however, the sealing material will not readily pass down through the mud or is lighter than the drilling fluid, it may be lowered by the container 12, as described in connection with Fig. 1.

When the sealing material first passes out of the hole 7 and around the bit 6, it is mixed with the drilling liquid. If it is heavier than the drilling liquid, it will accumulate in the bottom of the drill hole, as shown in the drawing. However, since the sealing material is wetted with water and the drilling liquid Zyx is immiscible with water, and since the surface tension of the water exceeds that of the drilling liquid, some of the sealing material will be drawn to the walls of the drill hole immediately surrounding the bit, and the hydrostatic pressure of the liquid column above it will serve to force it into pores or openings of the rock in which the hole is being drilled and form a coating 15 which will effectively seal the walls of the hole and thus prevent loss of the drilling liquid Zyx which would otherwise pass into and outward through said pores or openings.

When the sealing material is lighter than the drilling liquid Zyx, the water-wetted sealing material will (by reason of the differences in surface tension between water and the drilling liquid), be drawn into contact with the walls of the drill hole by surface tension and there, by reason of the hydrostatic pressure aforementioned, it will be forced into the pores of the rock and form an effective coating for the drill hole, as previously described.

While the means above described in connection with Figs. 1 and 2 may be employed for introducing the sealing material into the bottom of the well through the drill pipe, any other suitable means may be substituted therefor, the essential thing being that the sealing material is introduced into the drill hole through the drill pipe.

It is to be specifically understood that this invention is not limited to any specific heavy liquid or type of sealing material. Whereas U. S. Patent No. 2,043,504 is limited to the use of liquids heavier than the rocks drilled, the application of this invention is not so restricted. The drilling liquid may be heavier or lighter than the rocks drilled, and the sealing material may be heavier or lighter than the drilling liquid. The principle involved is utilizing the difference between the surface tension of the vehicle for the sealing material and that of the drilling liquid where one is immiscible with the other.

Having thus described the invention, what is claimed is:

1. In a process of drilling wells, the steps of introducing into the drill hole a drilling fluid heavier than and immiscible with water and applying a coating to the walls of the drill hole by also introducing into the bottom of the drill hole a finely divided solid carried by a liquid vehicle which differs in surface tension from the drilling fluid.

2. In a process of drilling wells, the steps of introducing into the drill hole a drilling fluid heavier than and immiscible with water and sealing the walls of the drill hole against infiltration of the drilling liquid by also introducing into the bottom of the drill hole a finely divided solid material wet with water.

3. In a process of drilling wells, the steps of introducing into the drill hole a drilling fluid heavier than and immiscible with water and applying a coating to the walls of the drill hole by also introducing into the bottom of the drill hole a coating material carried by a liquid vehicle having a greater surface tension than the drilling fluid.

4. In a process of drilling wells, the steps of introducing into the drill hole a drilling fluid that is heavier than and immiscible with water and also introducing into the bottom of the drill hole a coating material, using water as the vehicle for said coating material.

5. In a process of drilling wells, the steps of introducing into the drill hole a drilling fluid heavier than and immiscible with water and also introducing into the bottom of the drill hole solid particles of coating material heavier than the drilling fluid, using water as the vehicle for said particles.

6. In a process of drilling wells, the steps of introducing into the drill hole a drilling fluid heavier than and immiscible with water and simultaneously coating the walls of the drill hole by introducing into the bottom of the drill hole particles of material lighter than the drilling fluid, using water as the vehicle for said coating particles.

7. In a process of drilling wells, the steps of introducing into the drill hole a drilling fluid heavier than and immiscible with water and also introducing into the bottom of the drill hole a finely divided solid wet with a liquid that is immiscible with the drilling fluid and has a greater surface tension than said drilling fluid.

8. In a process of drilling wells, the steps of introducing into the drill hole a drilling fluid heavier than and immiscible with water, and also introducing into the bottom of the drill hole wall-sealing material wetted with water.

9. In a process of drilling wells, the steps of introducing into the drill hole a drilling fluid heavier than and immiscible with water and coating the walls of the drill hole as drilled by introducing into the drilling fluid and around the drill in the drill hole a finely-divided solid carried by a liquid vehicle which differs in surface tension from the drilling fluid.

10. In a process of drilling wells, the steps of surrounding the drill at the drilling point with a drilling fluid heavier than and immiscible with water and introducing around the drill bit a finely-divided solid carried by a liquid vehicle which differs in surface tension from the drilling fluid.

GEORGE BLOW.